United States Patent [19]

Motoyama

[11] Patent Number: 5,629,529
[45] Date of Patent: May 13, 1997

[54] RECORDING MEDIUM TRANSPORTING APPARATUS AND IMAGE FORMING SYSTEM CAPABLE OF DISTINGUISHING BETWEEN TYPES OF RECORDING MEDIA

[75] Inventor: Eiichi Motoyama, Tokyo, Japan

[73] Assignee: Canon Kabushiki Kaisha, Tokyo, Japan

[21] Appl. No.: 413,954

[22] Filed: Mar. 30, 1995

[30] Foreign Application Priority Data

Apr. 5, 1994 [JP] Japan ................... 6-089210

[51] Int. Cl.[6] ................ G03G 15/00; H04N 1/04; B65H 7/14
[52] U.S. Cl. ............. 250/559.24; 358/449; 358/488
[58] Field of Search ............. 250/559.24, 559.2, 250/539.19, 559.37, 559.4, 234, 235, 236; 358/449, 487, 488, 474, 482, 483; 355/311

[56] References Cited

U.S. PATENT DOCUMENTS

4,885,613  12/1989  Kudoh ................... 355/310
5,274,395  12/1993  Mizoguchi et al. ........... 347/183
5,493,422  2/1996  Morikawa et al. ........... 358/474

Primary Examiner—Edward P. Westin
Assistant Examiner—John R. Lee
Attorney, Agent, or Firm—Fitzpatrick, Cella, Harper & Scinto

[57] ABSTRACT

A recording medium transporting apparatus including a transporting device for transporting a recording medium, a guide member for assisting the transporting of the medium, and detecting device for detecting the recording medium. The detecting device has a state detecting unit for detecting the states of the guide member and the recording medium. A storage device stores the data of the state detecting device. A control device controls the detecting device and storage device. An image forming system including the above-described transporting apparatus and an image forming device for forming an image onto the recording medium transported from the recording medium transporting apparatus.

7 Claims, 7 Drawing Sheets

SENSE START

RECORDING MEDIUM TRANSPORTING APPARATUS AND IMAGE FORMING SYSTEM CAPABLE OF DISTINGUISHING BETWEEN TYPES OF RECORDING MEDIA

BACKGROUND OF THE INVENTION

1. Field of the Invention

The present invention relates to, for example, an image forming system in which a plurality of types of recording media can be used, and, in particular, to a detector for detecting recording medium.

2. Related Background Art

Figure 7:
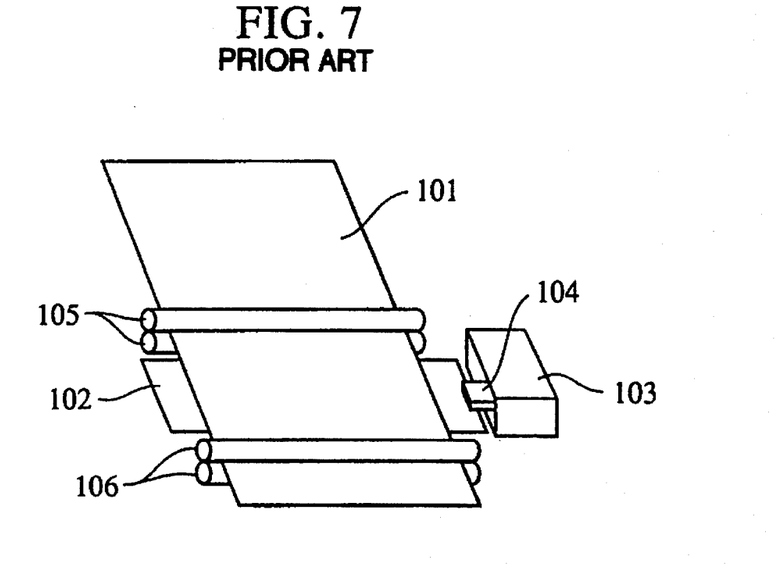
FIG. 7 is a perspective view of the critical portion of a conventional recording medium transporting apparatus.

FIG. 7 is a schematic diagram illustrating the general operation of an image forming system, in which reference numeral 101 denotes a recording medium (such as paper) onto which is formed an image; reference numeral 102 denotes a platen; reference numeral 103 denotes a recording head; reference numeral 104 denotes a paper width sensor; reference numeral 105 denotes sub-scanning rollers; and reference numeral 106 denotes discharge rollers.

The paper width sensor 104 is mounted to the recording head 103 with high precision. Allowing the recording head 103 to scan as during recording operation makes it possible for the paper width sensor 104 to read the state of the platen 102 or the recording medium 101.

Figure 8:
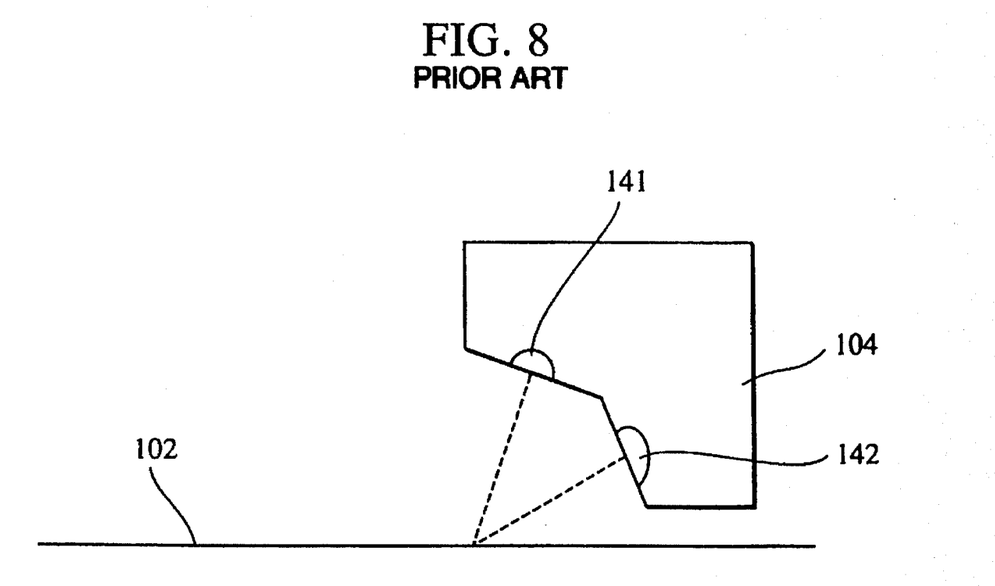
FIG. 8 is a schematic view of a detecting means applied to a conventional detector.

FIG. 8 is a detailed view of the paper width sensor 104.

The paper width sensor 104 is the so-called reflection-type sensor, in which light emitted from light-emitting section 141 is reflected by the platen 102 (or the recording medium 101), and the reflected light is detected by a light-receiving section 142 to generate a voltage in accordance with the amount of reflected light.

In preparing for recording, the recording medium 101 is fed to the gap between the sub-scanning rollers 105 by a feeding means (not illustrated). When it reaches the gap, the sub-scanning rollers 105 rotate to transport the recording medium 101 on the platen 102 to the gap between the discharge rollers 106. When it reaches the gap, the discharge rollers 106 rotate to allow the recording medium 101 to be in a uniformly stretched state on the platen 102.

In general, the platen 102 is positioned higher than the line formed by connecting the gap between the sub-scanning rollers 105 and the gap connecting the discharge rollers 106. In addition, the pressure applied by the discharge rollers 106 is low. These rollers are designed so that they convey more recording media than the sub-scanning rollers 105 per unit time, and, as described above, puts the recording medium 101 under tension.

Thereafter, the paper width sensor 104 scans the recording medium 101 to determine the position and type of the recording medium, after which the recording range, image parameter, etc., are set. This completes the preparation for recording.

The types of recording medium 101 used include OHP sheets used for OHP in addition to the ordinarily used paper (hereinafter simply referred to as paper).

The position and type of paper is determined in the following way.

For ordinary paper, the paper width sense data at position x is compared with the threshold value T to determine the position (size) of the paper. An error is said to occur if paper could not be detected due to, for example, paper misfeeding.

For OHP sheets, an error is said to occur when the fed sheets are not detected.

When OHP sheets are used, the operator inputs that the recording media used are OHP sheets by means of operation section.

When the paper width sensor detects the presence of paper, the recording media used are not OHP sheets. This is defined as an error.

However, in the above-described conventional example, the operator must give an instruction to determine the type of recording medium 101 used, such as, for example, whether the medium type used is ordinary paper or an OHP sheet. In such a case, the operator may forget to make specifications or make operational errors which result in malfunctioning. In addition, a plurality of paper types, including OHP sheets, cannot be correctly distinguished automatically even if this was attempted due to, for example, dirty platen or changes in platen density with the passage of time.

SUMMARY OF THE INVENTION

A first object of the invention is to provide a recording medium transporting apparatus capable of automatically distinguishing the different types of recording media and an image forming system.

A second object of the invention is to provide a recording medium transporting apparatus having a transporting means for transporting recording medium, a guide member for assisting the transporting of the recording medium, and a detecting means for detecting the recording medium, wherein the detecting means has a state detecting means for detecting the state of the guide member and the recording medium, storage means for storing the data of the state detecting means, and control means for controlling the state detecting means and the storage means.

DETAILED DESCRIPTION OF THE EMBODIMENTS

Before describing the embodiments, the steps taken until image recording will be described. Although these steps are common to each embodiment, these steps do not limit the invention.

Figure 2:
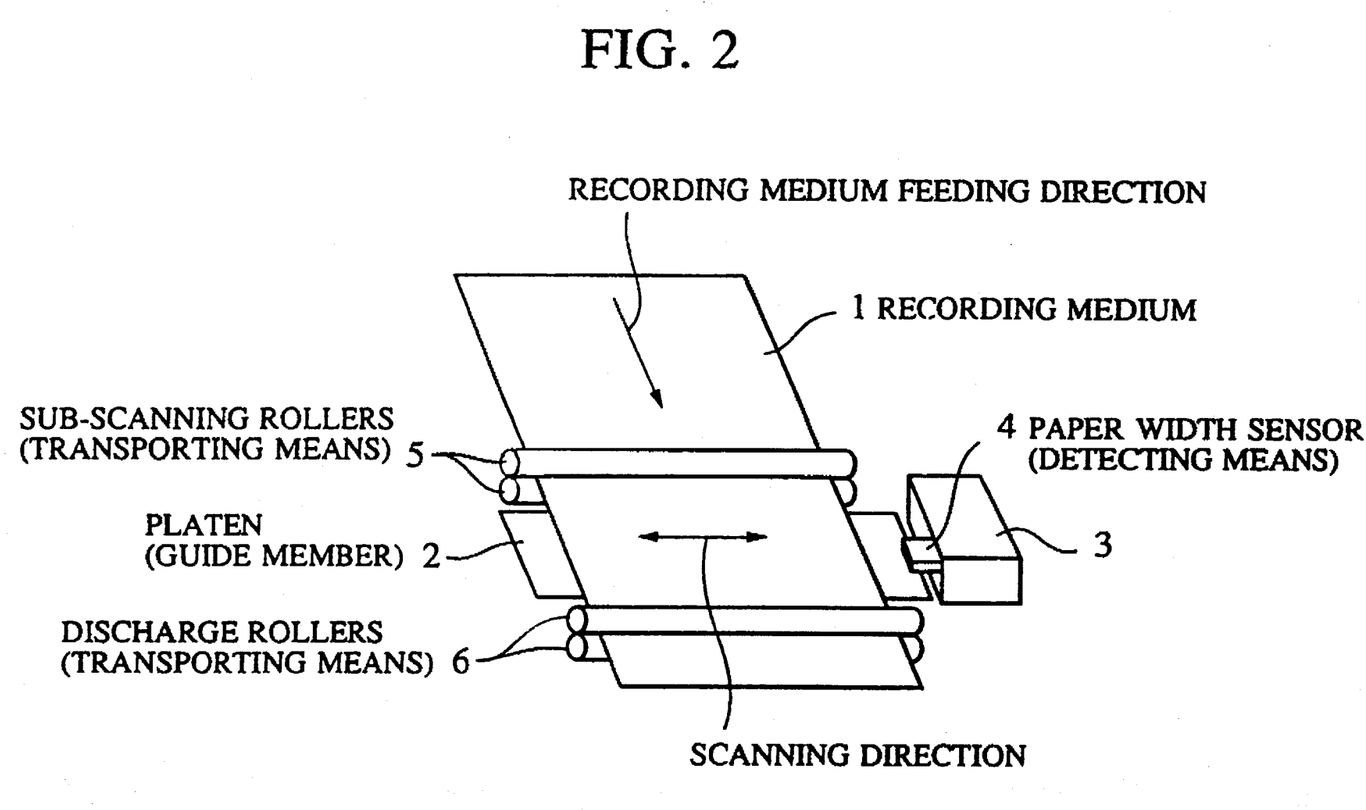
FIG. 2 is a perspective view of the critical portion of the recording medium transporting apparatus of an embodiment of the invention.

FIG. 2 illustrates schematically the operation of an image forming system embodying the invention. Referring to the same figure, reference numeral 1 denotes a recording medium (such as paper) for forming thereon an image; reference numeral 2 denotes a platen serving as guide member for assisting the transporting of the recording medium; reference numeral 3 denotes a recording head; reference numeral 4 denotes a paper width sensor serving as detecting means; reference numeral 5 denotes sub-scanning rollers; and reference numeral 6 denotes discharge rollers. The recording head 3 and paper width sensor 4 serve as detectors, while sub-scanning rollers 5 and discharge rollers 6 serve as transporting means.

The paper width sensor 4 is mounted to the recording head 3 with high precision. Allowing the recording head 3 to scan as during recording operation makes it possible for the paper width sensor 4 to read the state of the platen 2 or the recording medium 1.

Figure 3:
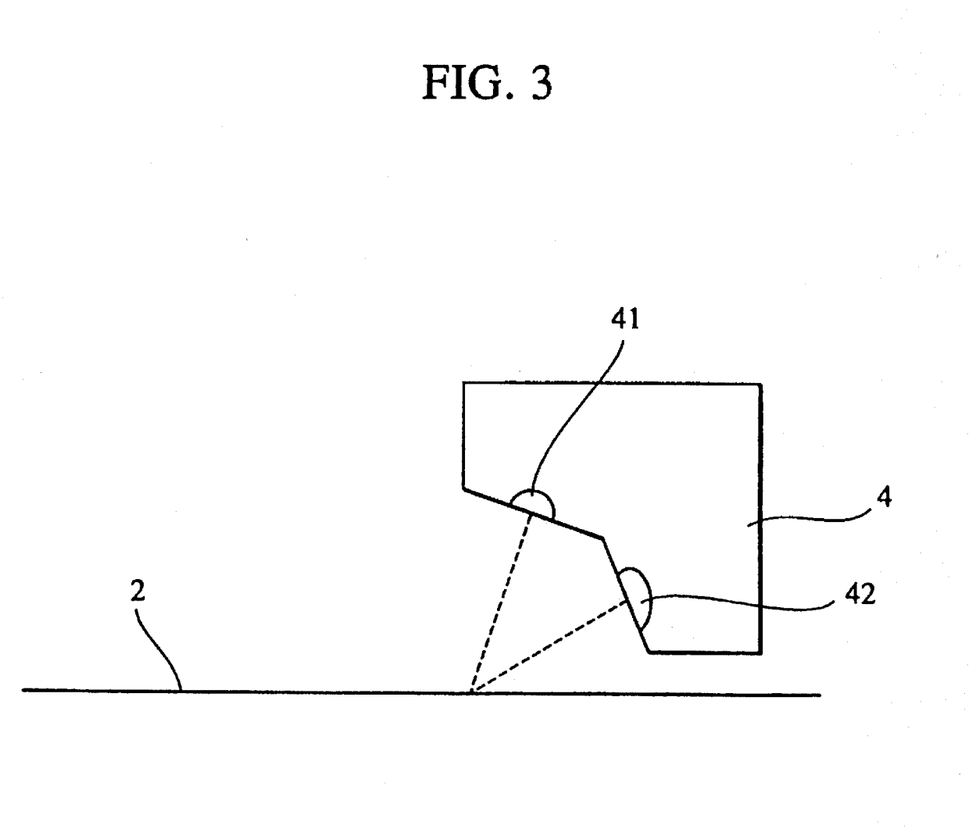
FIG. 3 is a schematic view of a detecting means applied to a detector of the invention.

FIG. 3 is a detailed view of the paper width sensor 4.

The paper width sensor 4 is the so-called reflection-type sensor, in which light emitted from light-emitting section 41 is reflected by the platen 2 (or the recording medium 1), and the reflected light is detected by a light-receiving section 42 to generate a voltage in accordance with the amount of reflected light.

First, with no recording medium 1 on the platen 2, the paper width sensor 4 scans the platen 2 to read the state of the platen 2.

Thereafter, in preparing for recording, the recording medium 1 is fed to the gap between the sub-scanning rollers 5 by a feeding means (not illustrated). When it reaches the gap, the sub-scanning rollers 5 rotate and transports the recording medium 1 on the platen 2 to the gap between the discharge rollers 6. When it reaches this gap, the discharge rollers 6 rotate to allow the recording medium 1 to be in a uniformly stretched state on the platen 2.

In general, the platen 2 is positioned higher than the line formed by connecting the gap between the sub-scanning rollers 5 and the gap connecting the discharge rollers 6. In addition, the pressure applied by the discharge rollers 6 is low. These rollers are designed so that they convey more recording media than the sub-scanning rollers 5 per unit time, and, as described above, puts the recording medium 1 under tension.

Thereafter, the paper width sensor 4 scans the recording medium 1 to determine the position and type of the recording medium, after which the recording range, image parameter, etc., are set. This completes the preparation for recording.

The pre-reading of the state of the platen 2 may be performed at any time period as long as the recording width and determinations in recording method are not affected. It may be performed, for example, every time before recording medium feed, after a predetermined number of sheets have been transported, or at predetermined time intervals.

The paper width sensor, in addition to being one in which the amount of reflected light is detected as described above, may also be one in which reflected light is detected by dividing it into planes of polarization, or one in which the phase difference is detected. In addition to light, radio waves or ultrasonic waves may also be used.

In addition, a combination of a plurality of sensors allows multidimensional (or relative) determinations.

In the embodiment to be described below, it is assumed that, in addition to ordinary paper, the paper types which can be determined are gloss paper and OHP sheets used in OHP.

Figure 5:
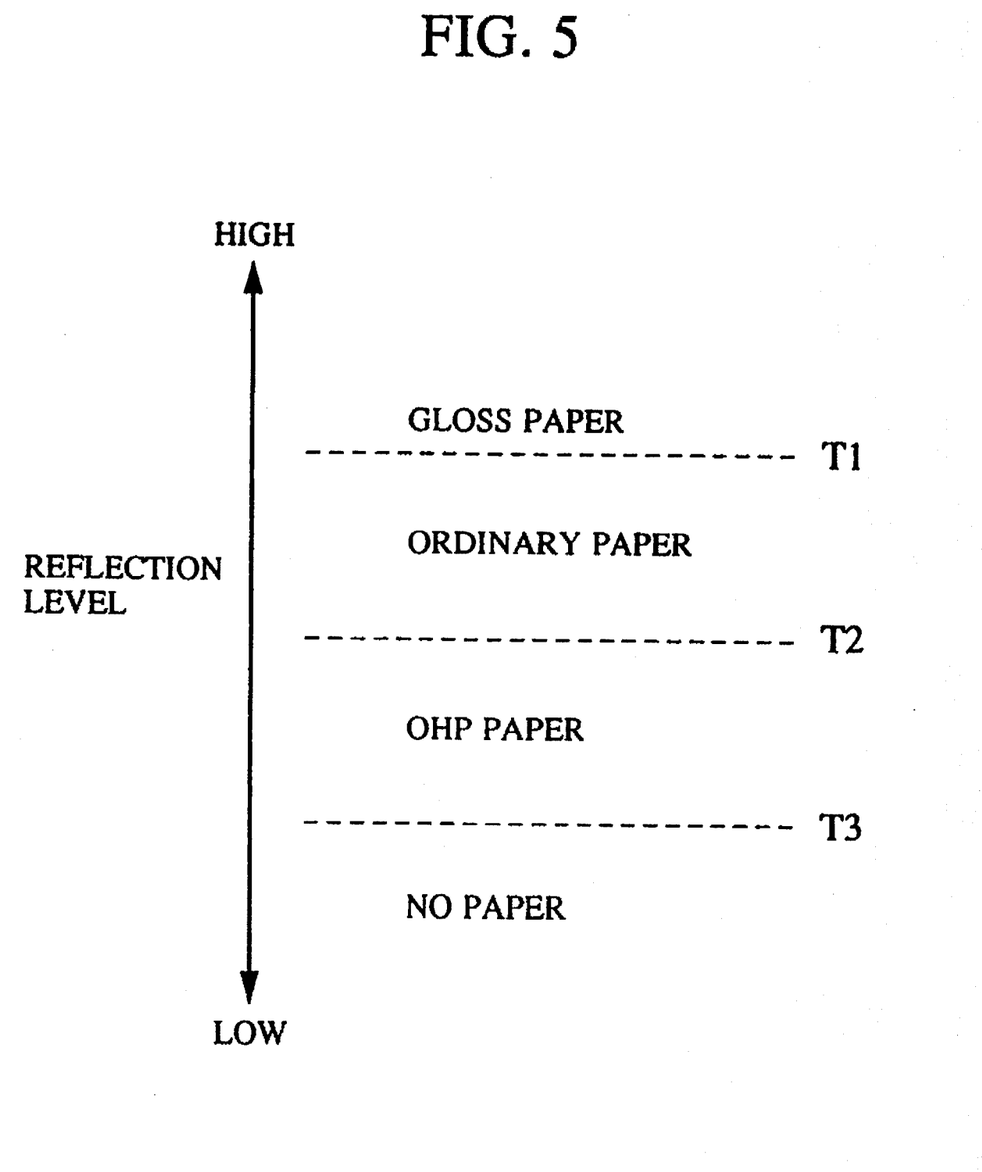
FIG. 5 is an explanatory view illustrating the threshold values used to determine the type of recording medium in an embodiment of the invention.

FIG. 5 shows the relationship between the types of recording medium (paper type) and the reflection level of the paper width sensor. When the reflection level is greater than or equal to T1, the paper type is gloss paper; when it is more than T2 but less than T1, the paper type is ordinary paper; when it is more than T3 but less than T2, the paper type is OHP paper; and when it is less than T3, no paper is present.

First Embodiment

Figure 1:
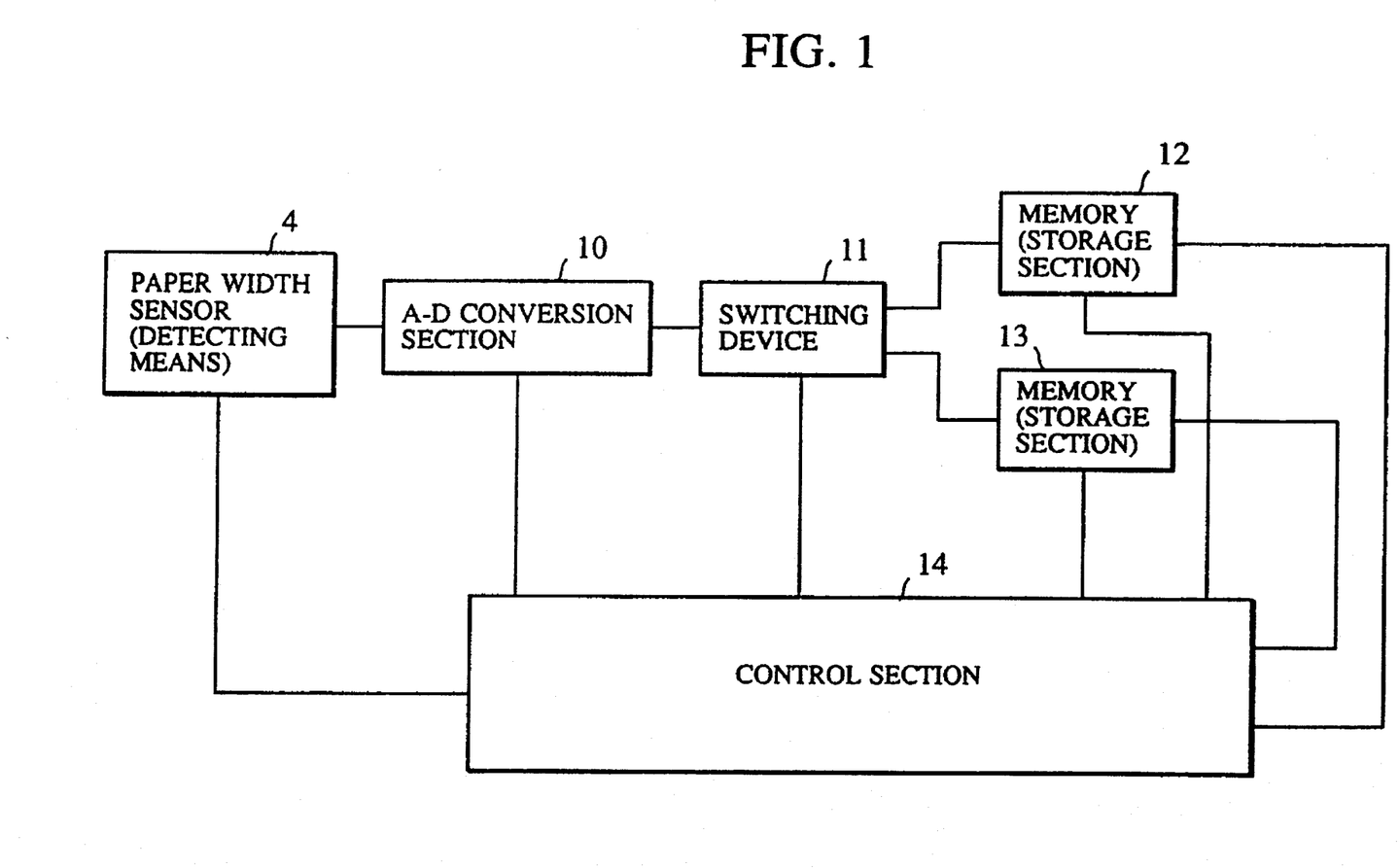
FIG. 1 is a block diagram of a detector applied to a recording medium transporting apparatus of a first embodiment of the invention.

FIG. 1 is a block diagram of a detector applied to a recording medium transporting apparatus of a first embodiment of the invention. Referring to the same figure, reference numeral 4 denotes a paper width sensor serving as detecting means; reference numeral 10 denotes an A-D conversion section for converting the analog output of the paper width sensor 4 to digital output; reference numeral 11 denotes a switching device for determining whether to send the digitized output of the aforementioned A-D conversion section 10 to memory 12 or memory 13; and reference numerals 12 and 13 each denote a memory for storing the output of the A-D conversion section 10 or the output of the paper width sensor 4. Reference numeral 14 denotes a control section for controlling each of the aforementioned parts.

In reading the state of platen 2 serving as guide member for assisting the transporting of the recording medium, the control section 14 switches the switching device 11 for connection to the memory 12 and the light-emitting section of the paper width sensor 4 is lit. Conversion of the analog to digital data by the A-D conversion section is started and scanning by the recording head 3 (paper width sensor 4) is started.

The recording head 3 is moved by a pulse motor (not illustrated), and the address of the memory 12 is updated with every drive pulse of the aforementioned motor, which causes storage of paper width sensor output data for one scanning.

In reading the platen state after recording medium 1 feeding, the control section 14 causes the switching device 11 to be switched for connection to memory 13. The light-emitting section of the paper width sensor 4 is lit, conversion of analog to digital data by the A-D conversion section 10 is started, and scanning by the recording head 3 (paper width sensor 4) is started.

The address of memory 13 is updated with every drive pulse of the aforementioned pulse motor, and paper width sensor output for one scanning is stored. After storage of paper width sensor output for one scanning, the light-emitting section of the paper width sensor 4 is turned off.

Upon completion of the reading of the platen state after recording medium 1 feeding, the paper width and type are determined.

To determine the paper width and type, the following calculation is carried out based on the data stored in memories 12 and 13.

Figure 4:
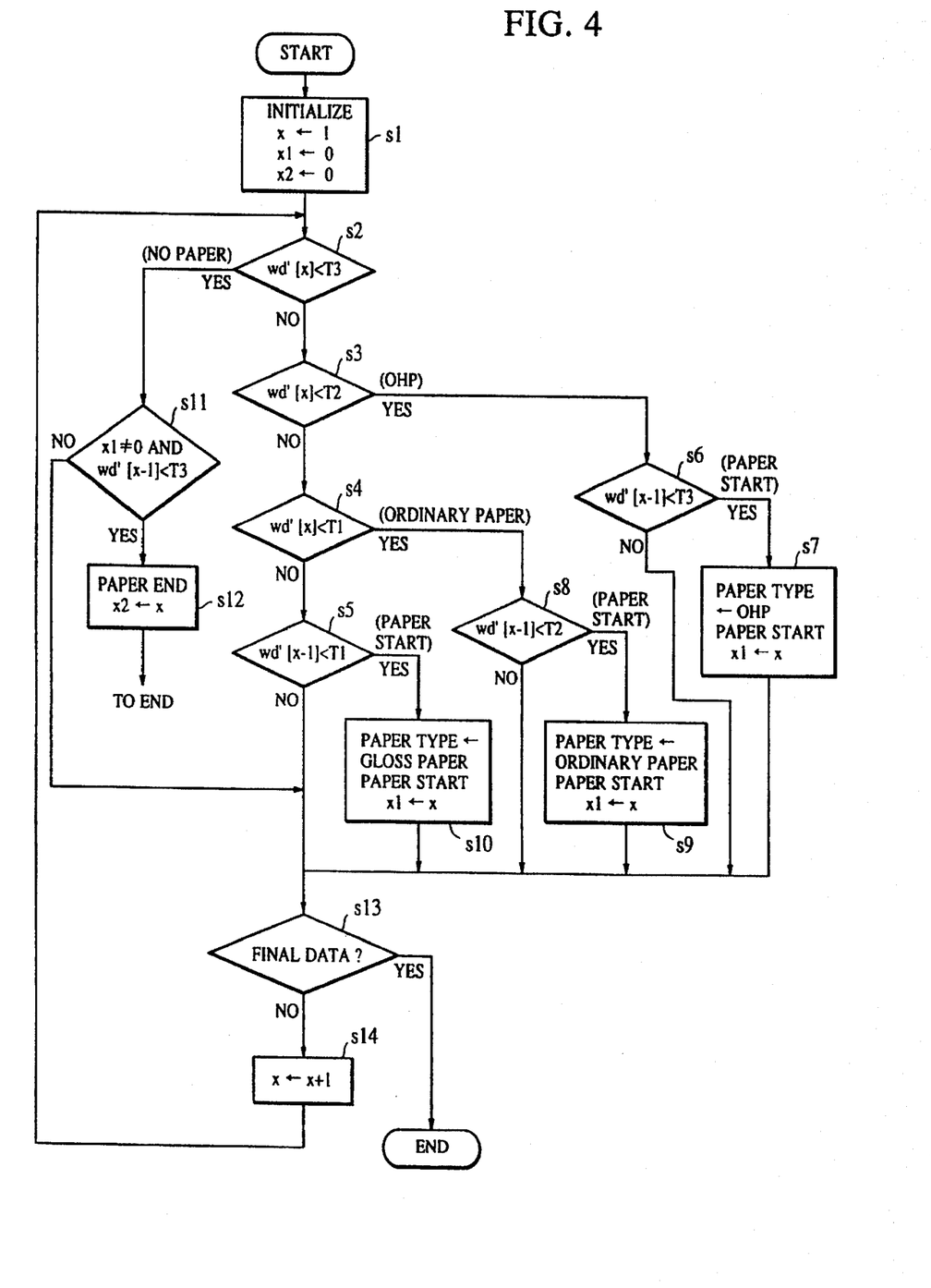
FIG. 4 is a flowchart of the steps for determining the type of recording medium in an embodiment of the invention.

The data read at each position x is defined as follows. The data obtained by reading the platen 2 state is defined as pd[x], while data as read when recording medium 1 exists is defined as wd[x]. When the maximum output of A-D conversion section 10 is Dmax, the recording medium read data, wd'[x], is found by Formula 1:

$$wd'[x] = \frac{wd[x] - pd[x]}{Dmax - pd[x]} \times Dmax \qquad \text{(Formula 1)}$$

wd'[x] is used to determine the paper type and width (recording medium hereinafter referred to as simply paper) in the process of the flowchart illustrated in FIG. 4.

First, in Step 1, initializations are carried out for address x for reading out data, register x1 indicating the starting position of the paper, and register x2 indicating the end position of the paper.

Next, in Step 2, whether or not data wd'[x]<T3 holds is determined. If it holds, paper is absent, so that the process proceeds to Steps 11, 13. If the data is not final data in Step 13, this data is updated in Step 14 and the process returns back to Step 2.

If in Step 2, wd'[x]≧T3, the process proceeds to Step 3, and whether or not wd'[x]<2 holds is determined in Step 3. If it does hold, the reflection level is that of an OHP sheet, and the process proceeds to Step 6.

In Step 6, whether or not data wd'[x−1]<T3 holds is determined. In other words, a determination is made as to whether or not the reflection level of the previous data is that indicating paper absence. This result is used to determine whether or not to carry out paper start. If the relationship holds, paper start is to be performed, so that the process proceeds to Step 7. With the paper type determined as OHP and the paper start position x1 defined as x, the process proceeds to Step 13. If the relationship in Step 6 does not hold, the paper start position has already been detected, so that the process proceeds to Step 14.

In the same way, the same determinations are made regarding ordinary paper in Steps 4 and 8, and gloss paper in Steps 5 and 10.

Eventually, if the relationships in Steps 2 and 11 hold, paper end position will be detected, and the paper end position register x2 will be defined as x. This completes the process.

The paper type is determined by the aforementioned process, while the paper size is determined by x2−x1.

In the aforementioned embodiment, although corrections were made on the reflection level data of the platen state after feeding of recording medium 1, the same results can be obtained even if corrections are made on the paper type determination level.

In this case, it is necessary to calculate the threshold values for every position x for which determinations are made and for every paper type.

If the operation speed of the control section 14 is fast enough, determinations as those illustrated in FIG. 4 can be performed, without storing the platen state after feeding of recording medium 1 into memory 13. In this case, memory 13 is not required, and switching device 11 directly passes reflection data to control section 14 to carry out calculation.

Memories 12 and 13 may be constructed as one memory, and the switching device 11 may be constructed such that it switches the address space of the memory.

Obviously, the light-emitting section of the paper width sensor 4 may be constantly lit.

With such a construction, unlike in conventional apparatuses, automatic determination of the type of recording medium 1 can be performed, without requiring operator instruction. This eliminates the problem of the operator forgetting to make specifications and prevents malfunctioning caused by mis-operations.

The data of platen 2 serving as guide member is stored in the memory serving as storage section with every scanning, so that such problems regarding dirty platen 2 or changes in density with time can be dealt with.

Second Embodiment

Figure 6:
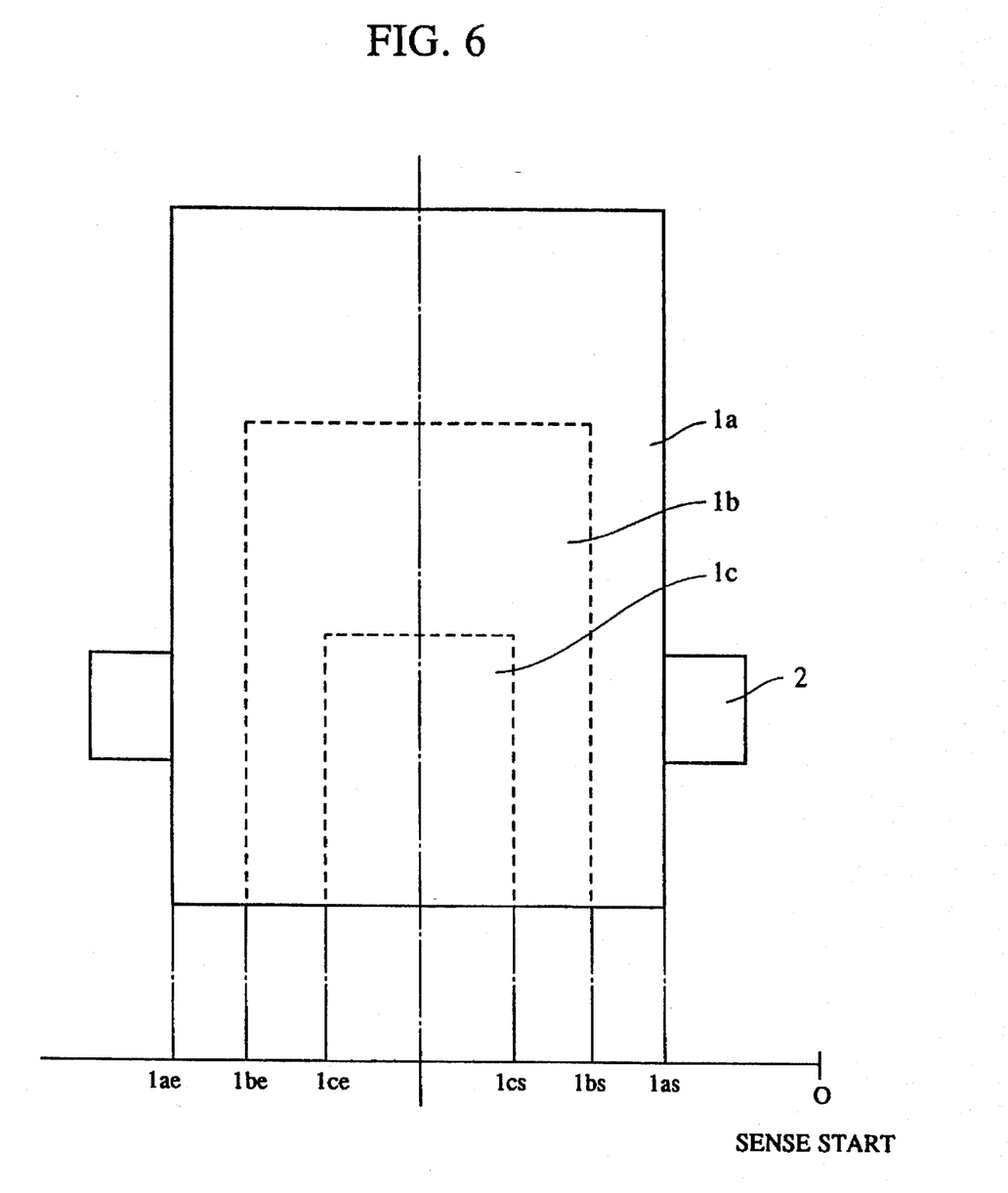
FIG. 6 is a schematic view illustrating the relationship between the platen and recording medium size in a second embodiment of the invention.

The construction of the second embodiment is the same as that of the first, except that the control method is different. FIG. 6 shows the positions of recording medium 1 when it is fed on platen 2. Referring to the same figure, reference numeral 1a denotes the position of the recording medium having the largest size; reference numeral 1c denotes the position of the medium having the smallest size; and reference numeral 1b denotes the position of the medium having a size somewhere between these two sizes. For simplification, three sizes are used, but the recording medium size is not limited thereto.

In addition, reference numeral 1as denotes the starting position and reference numeral 1ae denotes the paper end position for feeding a 1a size paper. In the same way, reference numeral 1bs denotes the starting position and reference numeral 1be denotes the end position for feeding a 1b size paper. Reference numeral 1cs denotes the starting position and reference numeral 1ce denotes the end position for feeding a 1c size paper. The distances to the positions may be calculated from the number of drive pulses of the pulse motor.

In the second embodiment, the states of platen 2 at areas around 1as, 1bs, 1cs, 1ae, 1be, and 1ce are previously read and stored.

In the structural view of FIG. 1, reference numeral 4 denotes a paper width sensor; reference numeral 10 denotes an A-D conversion section for converting analog output of the paper width sensor to digital output; reference numeral 11 denotes a switching device for determining whether to send the digitized output of the aforementioned A-D conversion section 10 to either memory 12 or memory 13; and reference numerals 12 and 13 each denote a memory for storing the output of the A-D conversion section 10, that is the output of the paper width sensor 4. Reference numeral 14 denotes a control section for controlling each of the aforementioned parts.

In reading the state of platen 2, the control section 14 causes the switching device 11 to be switched for connection to memory 12. The light-emitting section of the paper width sensor 4 is lit to start scanning by recording head 3 (paper width sensor 4).

A pulse motor (not illustrated) is used to move the recording head 3. When the control section 14 detects that the recording medium has reached the area near 1as, the A-D conversion section 10 starts to convert data from analog to digital data. The address of memory 12 is updated with every drive pulse of the aforementioned pulse motor. If it detects that the recording medium has moved away from the area near 1as, the operation of the A-D conversion section 10 is stopped to stop the updating of the address of memory 12.

If it detects that the recording medium has reached the area near 1bs, A-D conversion section 10 restarts conversion of analog data to digital data to restart updating of the address of memory 12.

If it detects that the recording medium has moved away from the area near 1bs, the operation of the A-D conversion section 10 is stopped to stop the updating of the address of memory 12.

In the same way, reflection level data of the areas around 1cs, 1ce, 1be, and 1ae are stored into memory 12.

When a paper width sensor output for one scanning is stored, the light-emitting section of paper width sensor 4 is turned off.

In reading the platen state after feeding of recording medium 1, control section 14 causes the switching device 11 to be switched for connection to memory 13. This lights the light-emitting section of the paper width sensor 4 to start scanning by the recording head 3 (paper width sensor 4).

A pulse motor (not illustrated) is used to move the recording head 3. When the control section 14 detects that the recording medium has reached the area near 1as, the A-D conversion section 10 starts to convert data from analog to digital data. The address of memory 13 is updated with every drive pulse of the aforementioned pulse motor. If it detects that the recording medium has moved away from the area near 1as, the operation of the A-D conversion section 10 is stopped to stop the updating of the address of memory 13.

If it detects that the recording medium has reached the area near 1bs, A-D conversion section 10 restarts conversion of analog data to digital data to restart updating of the address of memory 13.

If it detects that the recording medium has moved away from the area near 1bs, the operation of the A-D conversion section 10 is stopped to stop the updating of the address of memory 13.

In the same way, reflection level data of the areas around 1cs, 1ce, 1be, and 1ae are stored into memory 13.

When the necessary paper width sensor output is stored, the light-emitting section of paper width sensor 4 is turned off.

It is obvious that for simplification, all paper width sense data for one scanning may be stored.

When the reading of the platen state after feeding of recording medium 1 is completed, the paper width and type are determined.

To determine the paper width and type, the following calculation is carried out based on the data stored in memories 12 and 13.

The read data at each position x is defined as follows. The data obtained by reading the platen 2 state is defined as pd[x], while the data as read when recording medium 1 exists is defined as wd[x]. When the maximum output of A-D conversion section 10 is Dmax, the recording medium read data, wd'[x], is found by Formula 2:

$$wd'[x] = \frac{wd[x] - pd[x]}{Dmax - pd[x]} \times Dmax \quad \text{(Formula 2)}$$

wd'[x] is used to determine the paper type and width (recording medium hereinafter referred to as simply paper) in the process of the flowchart illustrated in FIG. 4.

First, in Step 1, initializations are carried out for address x for reading out data, register x1 indicating the starting position of the paper, and register x2 indicating the end position of the paper.

Next, in Step 2, whether or not data wd'[x]<T3 holds is determined. If it holds, there is no paper, so that the process proceeds to Steps 11, 13. If the data is not final data in Step 13, this data is updated in Step 14 and the process returns back to Step 2.

If in Step 2, wd'[x]≧T3, the process proceeds to Step 3, and whether or not wd'[x]<2 holds is determined in Step 3. If it does hold, the reflection level is that of an OHP sheet, and the process proceeds to Step 6.

In Step 6, whether or not data wd'[x−1]<T3 holds is determined. In other words, a determination is made as to whether or not the reflection level of the previous data is that indicating no paper. This result is used to determine whether or not to carry out paper start. If the relationship holds, paper start is to be performed, so that the process proceeds to Step 7. With the paper type determined as OHP and the paper start position x1 defined as x, the process proceeds to Step 13. If the relationship in Step 6 does not hold, the paper start position has already been detected, so that the process proceeds to Step 14.

In the same way, the same determinations are made regarding ordinary paper in Steps 4 and 8, and for gloss paper in Steps 5 and 10.

Eventually, if the relationships in Steps 2 and 11 hold, paper end position will be detected, and the paper end position register x2 will be defined as x. This completes the process.

With the determination of the paper type already being carried out, the paper size is determined in the following way.

If x1 is near 1as, and x2 is near 1ae, the paper size is 1a.

If x1 is near 1bs, and x2 is near 1be, the paper size is 1b.

If x1 is near 1cs, and x2 is near 1ce, the paper size is 1c.

In the aforementioned embodiment, although corrections were made on the reflection level data of the platen state after feeding of recording medium 1, they may be made on the paper type determination level to obtain the same results.

In this case, it is necessary to calculate the threshold value for each position x for which determinations are made and for each paper type.

If the operation speed of the control section 14 is fast enough, determinations as those illustrated in FIG. 4 can be performed, without storing into memory 13 the platen state after feeding of recording medium 1. In this case, memory 13 is not required, and switching device 11 directly transfers reflection data to control section 14 to carry out calculation.

Memories 12 and 13 may be constructed as one memory, and the switching device 11 may be constructed such that it switches the address space of the memory.

Obviously, the light-emitting section of the paper width sensor 4 may be constantly lit.

With such a construction, the same effects as those of the first embodiment can be obtained.

Although the control method in the second embodiment is somewhat complicated, the capacity of memories 12 and 13 can be saved.

Third Embodiment

The construction of the third embodiment is the same as that of the first embodiment, except that the control method is different.

The third embodiment is an example in which more than one average value is obtained for the states of platen 2 previously read and stored. It is effective in dealing with such problems regarding dirty or continuously dirtied platen.

For example, with the maximum paper size being A4 size and the maximum paper width sense distance being 220 mm, an area is divided into 10 sections, each measuring 22 mm. Average value of the platen state data for each section is stored.

A description will be made of the process for taking in platen state data in the construction of FIG. 1. In the process, control section 14 causes switching device 11 to be switched for connection to memory 13. The light-emitting section of the paper width sensor 4 is lit. Conversion from analog to digital data is started by A-D conversion section 10 and scanning by the recording head 3 (paper width sensor 4) is started.

A pulse motor (not illustrated) is used to move the recording head 3. The address of memory 13 is updated again for every drive pulse of the aforementioned pulse motor. The paper width sensor output for one scanning is stored, after which the light-emitting section of the paper width sensor 4 is turned off.

Thereafter, control section 14 successively reads data stored in memory 13 and calculates the average value for every 22 mm section. The average values are stored in memory 12.

Memory 12 (memory for platen state data) may be of any capacity as long as it is capable of storing the data of the ten sections.

Obviously, if an average value calculating section is added, the control section 14 does not have to calculate the average values.

In reading the platen state after recording medium 1 feeding, the control section 14 causes the switching device 11 to be switched for connection to memory 13. The light-emitting section of the paper width sensor 4 is lit. Conversion from analog to digital data is started by the A-D conversion section 10 and scanning by the recording head 3 (paper width sensor 4) is started.

The address of memory 13 is updated with every drive pulse of the aforementioned pulse motor, and paper width sensor output for one scanning is stored. After storage of paper width sensor output for one scanning, the light-emitting section of the paper width sensor 4 is turned off.

Upon completion of the reading of the platen state after feeding of recording medium 1, the paper width and type are determined.

To determine the paper width and type, the following calculation is carried out based on the data stored in memories 12 and 13.

Average value of read platen 2 data at each position x is defined as pd[x'], where x' is the value for each of the ten sections measuring 22 mm.

With data read as when recording medium 1 exists is defined as wd[x] and the maximum output of the A-D conversion section defined as Dmax, the recording medium read data wd'[x] is obtained by using the following Formula 3:

$$wd'[x] = \frac{wd[x] - pd[x']}{Dmax - pd[x']} \times Dmax \quad \text{(Formula 3)}$$

wd'[x] is used to determine the paper type and width (recording medium hereinafter referred to as simply paper) in the process of the flowchart illustrated in FIG. 4.

First, in Step 1, initializations are carried out for address x for reading out data, register x1 indicating the starting position of the paper, and register x2 indicating the end position of the paper.

Next, in Step 2, whether or not data wd'[x]<T3 holds is determined. If it holds, there is no paper, so that the process proceeds to Steps 11, 13. If the data is not final data in Step 13, this data is updated in Step 14 and the process returns back to Step 2.

If in Step 2, wd'[x]≧T3, the process proceeds to Step 3, and whether or not wd'[x]<2 holds is determined in Step 3. If it does hold, the reflection level is that of an OHP sheet, and the process proceeds to Step 6.

In Step 6, whether or not data wd'[x−1]<T3 holds is determined. In other words, a determination is made as to whether or not the level of the previous data is that indicating no paper. This result is used to determine whether or not to carry out paper start. If the relationship holds, paper start is to be performed, so that the process proceeds to Step 7. With the paper type determined as OHP and the paper start position x1 defined as x, the process proceeds to Step 13. If the relationship in Step 6 does not hold, the paper start position has already been determined, so that the process proceeds to Step 14.

In the same way, the same determinations are made regarding ordinary paper in Steps 4 and 8, and for gloss paper in Steps 5 and 10.

Eventually, if the relationships in Steps 2 and 11 hold, paper end position will be detected, and the paper end position register x2 will be defined as x. This completes the process.

With the paper type already being determined, the paper size is determined by x2−x1.

In the aforementioned embodiment, although corrections were made on the reflection level data of the platen state after recording medium 1 feeding, corrections may be made on the paper type determination level data to obtain the same results.

Determinations such as those illustrated FIG. 4 may be performed without storing the platen state after feeding of recording medium 1 into memory 13. In this case, memory 13 is not required, and switching device 11 can pass the reflection level data to control section 14.

In addition, memory 12 and 13 may be constructed as one memory, and switching device 11 may be so constructed as being capable of switching the memory address space.

It is obvious that the light-emitting section of the paper width sensor 4 may be constantly lit.

With such a construction, the same effects as those of the first embodiment can be obtained.

The invention has the above-described construction and operation. The construction includes detecting means for detecting the states of a guide member and recording medium; storage section for storing data of the detecting means; and control section for controlling the detecting means and storage section and for performing computations; wherein comparison can be made of the recording medium and guide member by the detecting device to determine the type of recording medium, without being affected by changes of the guide member with time.

Of the detecting means data, the data obtained by reading the state of the guide member and data obtained by reading the state of the recording medium are used for making calculations to determine automatically the recording medium type. This makes it unnecessary for the operator to previously specify the type of recording medium. This eliminates conventional problems such as the operator forgetting to make specifications and malfunctioning caused by misoperation.

Easier determination of the type of recording medium is made possible because automatic determination by the control section is performed based on previously determined threshold values.

The guide member has a larger width than the recording medium. Data obtained by reading the state of the guide member may be data of the whole region scanned by the detecting means, data of the region which depends on the size of the recording medium to be transported, or representative data of the whole region scanned by the detecting means or representative data of each of a plurality of divided regions. Therefore, it is possible to obtain more accurate data, and to make more accurate determinations.

What is claimed is:

1. A recording medium transporting apparatus including transporting means for transporting recording medium, a guide member for assisting the transportation, and detecting means for detecting the recording medium when the recording medium is disposed against said guide member, wherein said detecting means includes:

(i) state detecting means for detecting a state of each of said guide member and the recording medium and for producing data based on the state of each of said guide member and the recording medium, the state of the recording medium including reflectivity;

(ii) storage means for storing the data of said state detecting means; and (iii) control means for controlling said state detecting means and said storage means.

2. A recording medium transporting apparatus according to claim 1, wherein said control means uses the data of said detecting means based on the state of each of said guide member and the recording medium to perform calculations to determine a type of the recording medium.

3. A recording medium transporting apparatus according to claim 2, wherein said control means determines the type of the recording medium based on previously determined threshold values.

4. A recording medium transporting apparatus according to claim 2 or 3, wherein said detecting means scans a region of said guide member, wherein said guide member has a larger width than the recording medium to be transported, and wherein the data based on the state of said guide member is data of the entire region to be scanned by said detecting means.

5. A recording medium transporting apparatus according to claim 2 or 3, wherein said guide member has a larger width than the recording medium to be transported, and wherein the data based on the state of said guide member is produced based on a region which depends on the size of the recording medium to be transported.

6. A recording medium transporting apparatus according to claim 2 or 3, wherein said detecting means scans a region of said guide member which has a plurality of divided regions, wherein said guide member has a larger width than the recording medium to be transported, and wherein the data based on the state of said guide member is representative of the whole region to be scanned by said detecting means or representative of each of the plurality of divided regions.

7. An image forming system comprising the recording medium transporting apparatus according to any one of claims 1 through 3 and an image forming means for forming an image onto the recording medium transported from said recording medium transporting apparatus.

* * * * *

UNITED STATES PATENT AND TRADEMARK OFFICE
CERTIFICATE OF CORRECTION

PATENT NO. : 5,629,529
DATED : May 13, 1997
INVENTOR(S) : Eiichi MOTOYAMA

It is certified that error appears in the above-indentified patent and that said Letters Patent is hereby corrected as shown below:

Title page, Abstract, [57], line 4, after "and", insert --a--.

Column 5, line 5, delete the comma (",") and insert therefor --and--.

Column 7, line 46, delete the comma (",") and insert therefor --and--.

Column 9, line 46, delete the comma (",") and insert therefor --and--.

Column 10, line 60, after "transporting", second occurrence, insert --a--.

Signed and Sealed this

Twenty-third Day of December, 1997

Attest:

BRUCE LEHMAN

*Attesting Officer*    *Commissioner of Patents and Trademarks*